C. H. Thurston,
Knob Attachment,
№ 77,550.   Patented May 5, 1868.

Witnesses
James Townsend
James F. Townsend

Inventor
Charles H. Thurston

United States Patent Office.

CHARLES H. THURSTON, OF MARLBORO, NEW HAMPSHIRE.

*Letters Patent No. 77,550, dated May 5, 1868.*

IMPROVED MODE OF ATTACHING KNOBS TO SCREWS.

*The Schedule referred to in these Letters Patent and making part of the same.*

TO ALL WHOM IT MAY CONCERN:

Be it known that I, CHARLES H. THURSTON, of Marlboro, in the county of Cheshire, and State of New Hampshire, have invented a new and useful Improvement in Attaching Wooden Knobs, Handles, &c., to Furniture and other Articles; and do hereby declare that the following is a full, clear, and exact description thereof, reference being had to the annexed drawings, making a part of this specification, in which—

Figure 2:
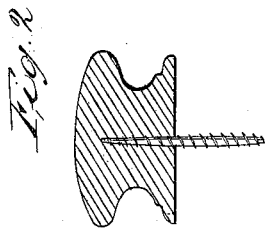
Figure 2 is a sectional view of a knob, showing the screw secured therein.
Figure 1:
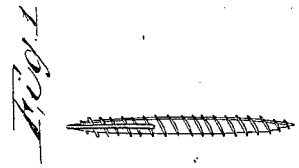
Figure 1 represents a screw ready for insertion into a knob.

Mineral knobs are usually made (for greater convenience in attaching) with screws secured in them, which are inserted in them while the material of which such knobs are formed is in a molten or plastic state, so that when they are applied for use, no screw or other fastening is left in sight to detract from the comeliness of the work. But in knobs and similar articles made of wood, it is not convenient to secure the screws in them; and for want of a better way, it is usual, in attaching them to drawers, doors, ceilings, &c., to pass a screw through the knob, into the article to which it is attached, or, *vice versa*, through the article into the knob, which often leaves the head of the screw in a place where it makes an unsightly appearance, besides which, it is usually much more convenient to attach knobs having the screws secured in them; and my invention consists of a method of securing screws in wooden knobs and other similar articles, which I do by providing a double-ended screw, with a slot in the thread at one end, for the insertion of a key or spline, so that after the screw is turned into the knob or other article, and the key is inserted in the slot, it cannot be turned out, but will remain in its place when taking the knob from the article to which it is secured, as shown in fig. 2. The screw may be formed by any suitable means, which any one skilled in the art of working metals would readily devise, the principal requisite being to form the slot for the insertion of the key so that the screw will always be firmly held in place by it, so that knobs may be attached for use simply by turning the screw into the article to which it is applied, and leaving no part of the screw in sight.

What I claim as my invention, and desire to secure by Letters Patent, is—

The construction of the attaching-screws in a wooden knob, by the formation of a slotted screw and key, causing it to remain in place, substantially as herein shown and described.

CHARLES H. THURSTON.

Witnesses:
JAMES TOWNSEND,
JAMES F. TOWNSEND.